United States Patent Office 3,215,657
Patented Nov. 2, 1965

3,215,657
WAX-ETHYLENE TERPOLYMER COMPOSITION
Aleksander Beresniewicz, Grand Island, N.Y., and John A. Simms, Wilmington, Del., assignors to E. I. du Pont de Nemours and Company, Wilmington, Del., a corporation of Delaware
No Drawing. Filed June 21, 1961, Ser. No. 118,523
15 Claims. (Cl. 260—28.5)

This invention relates to wax compositions and particularly to petroleum wax compositions containing certain copolymers of ethylene, which compositions are especially well suited for coating purposes.

Petroleum waxes have been used to coat paper, cloth, food products and the like to provide moisture vapor resistance. However, unmodified wax coatings are not especially well suited for this purpose because of their tendency to crack and peel off and because petroleum wax alone is practically devoid of adhesive properties. The use of polyethylene-modified coatings has been suggested but at least some polyethylenes are far from satisfactory for this use due to problems relating to their incompatibility with petroleum waxes and to the poor adhesive properties of the wax-copolymer compositions. Coating compositions which are predominantly petroleum wax and contain up to 20% of certain ethylene/vinyl acetate copolymers (E/VA) have been proposed because they possess improved ductilities and increased tensile strengths over unmodified or polyethylene-modified wax compositions. Such wax-E/VA compositions are not as satisfactory as generally desired in that they are deficient in one or more properties which are important for coating application uses.

It is an object of the invention to provide new modified petroleum wax compositions having properties making them especially well suited for coating uses. A further object is the provision of petroleum wax compositions containing copolymers of ethylene with certain monomers copolymerizable therewith whose presence improves substantially the adhesive properties of the compositions and renders them outstanding for coating purposes. Further objects will be apparent from the following description.

The compositions of the invention contain from 1 to about 75% by weight of an ethylene copolymer of the specific type defined hereinafter and from 99 to 25% of a petroleum wax. Minor amounts of other materials such as pigments, dyes, antioxidants and the like may also be present but, in general, the ethylene copolymer and petroleum wax should constitute at least 80% of the total composition weight.

The ethylene copolymer components of the compositions of the invention are copolymers of: (a) at least 65% by weight of ethylene; (b) at least 5% by weight of a second ethylenically unsaturated monomer which is an ester of the group consisting of: the vinyl esters of the lower (1-6 carbon) saturated aliphatic carboxylic acids; and the alkyl acrylates, the alkyl methacrylates, the dialkyl maleates and the dialkyl fumarates of the lower (1-6 carbon) aliphatic alcohols; and (c) 0.01 to 3% by weight of a third ethylenically unsaturated monomer of the group consisting of: acrylic, methacrylic, itaconic, maleic and fumaric acids; the anhydrides of itaconic, maleic and fumaric acids; the alkyl hydrogen maleates and the alkyl hydrogen fumarates; the monoacrylates and monoethacrylates of glycols; 2-hydroxy-3-aminopropyl allyl ether, allyl glycerol ether, divinyl glycol, 2-dimethylaminoethyl acrylate, 2-dimethylaminoethyl methacrylate and N-vinyl pyrrolidone.

For the sake of convenience, the ester monomers of the above group (b) are referred to hereinafter simply as "group (b) monomers," and the monomers of the above group (c) are referred to simply as "group (c) monomers."

Illustrative of the group (b) monomers used in preparing the copolymer components of the compositions of the invention are: vinyl formate, vinyl acetate, vinyl propionate and the vinyl butyrates; methyl ethyl, propyl, the butyl, the amyl and the hexyl acrylates and methacrylates; and the dimethyl, diethyl and dipropyl maleates and fumarates. The preferred group (b) monomers are vinyl acetate, ethyl acrylate and methyl methacrylate.

Illustrative of the group (c) monomers used in preparing the copolymer components of the compositions of the invention are: acrylic acid, methacrylic acid, itaconic acid, fumaric acid, maleic acid, maleic anhydrde, ethyl hydrogen maleate and methyl hydrogen fumarate; the monoacrylates and monomethacrylates of the glycols such as ethylene glycol, 1,2-propylene glycol, 1,4-butanediol and 1,6-hexanediol; 2-hydroxy-3-aminopropyl allyl ether, allyl glycerol ether, divinyl glycol, 2-dimethylaminoethyl acrylate, 2-dimethylaminoethyl methacrylate and N-vinyl pyrrolidone. The preferred group (c) monomers are acrylic acid and methacrylic acid.

The ethylene copolymers which are particularly preferred for use in preparing the compositions of the invention because of the excellent properties they contribute to the compositions of the invention and because their monomer components are relatively cheap and readily available, are those prepared employing vinyl acetate, ethyl acrylate or methyl methacrylate as the group (b) monomer and acrylic acid or methacrylic acid as the group (c) monomer.

It has been found that the poor compatibility of ethylene homopolymers with petroleum waxes is related at least in part to the crystallinity of such homopolymers. The high degree of compatibility of the present ethylene copolymers with petroleum waxes appears to be due largely to the fact that the copolymers are either amorphous or possess a low degree of crystallinity. The copolymer component which is chiefly responsible for reducing or eliminating the crystallinity of the copolymer (and increasing its compatibility with petroleum wax) is the group (b) monomer component thereof. Worthwhile reduction of the crystallinity results from the presence of as little as 5% by weight of the group (b) monomer component in the copolymer. Reduction of crystallinity increases as the content of that component is increased up to about 30% by weight, at which content copolymer crystallinity becomes substantially insignificant. However, compatibility again decreases as the group (b) monomer content of the copolymer is increased beyond about 35% so that copolymers containing more than about that amount of that component are not generally suitable for the present purpose. The group (b) monomer content preferably will be at least 12%, the most preferred range being 20 to 30% of the weight of the copolymer.

Unmodified petroleum wax and petroleum wax compositions containing ethylene homopolymers as modifiers exhibit poor adhesive properties. In contrast, the petroleum wax-ethylene copolymer compositions of this invention possess outstanding adhesive properties, due chiefly to the group (c) monomer component of the copolymer. As little as 0.01% by weight of that component in the copolymer has been found to improve significantly the adhesive properties of petroleum wax-copolymer blends. Preferably, the copolymer will contain 0.1 to 1% by weight of the group (c) monomer. Amounts of the latter greater than about 3% by weight are generally undesirable in that they adversely affect the compatibility of the copolymer with petroleum waxes.

The copolymers employed in the compositions of the invention can be readily prepared by copolymerizing a mixture of the comonomers in the presence of an initiator such as a peroxygen compound, e.g., lauryl peroxide or t-butyl peracetate, or an azobis compound, e.g., azobisisobutyronitrile, at a somewhat elevated temperature, e.g., 90–250° C., and a pressure of 1000 to 1750 atmospheres, then separating the copolymer from unpolymerized materials, e.g., by vaporizing the latter. By varying the monomers employed, the concentrations of the monomers and initiator in the reaction mixture, and conditions such as reaction time, pressure and temperature, copolymers of the desired kind and degree of polymerization can be obtained. The copolymers can be made by batch polymerization methods, but non-homogeneous copolymers generally result. Continuous methods in which a suitable mixture of the comonomers and initiator is continuously passed through a reaction zone maintained at the desired temperature and pressure conditions, are distinctly preferred since they yield substantially homogeneous copolymer products. The reaction zone and the rate of flow of reactant mixture therethrough should be such as to provide an appropriate residence time.

Following is a description of the preparation of a copolymer of ethylene, vinyl acetate and methacrylic acid suitable for use in compositions of the invention: ethylene, vinyl acetate, methacrylic acid and benzene (solvent) were fed continuously at rates, respectively, of 10.01, 4.49, 0.01 and 2.70 lbs./hr. into and through a two-liter stirred autoclave maintained at a temperature of 140–150° C. and a pressure of 1450 atmospheres. The initiator, azobisisobutyronitrile, was also fed into the autoclave at a rate of 0.8 lb./1,000 lbs. of polymer produced. Residence time in the autoclave was about 15 minutes. The reaction mixture continuously removed from the autoclave was stripped of unpolymerized monomers and solvent under reduced pressure and elevated temperature. After operations had reached a steady state, the conversion of monomers to copolymer was 12.4%. The ethylene/vinyl acetate/methacrylic acid copolymer product had a melt index of 14.1 and contained 29.2% vinyl acetate and 0.70% methacrylic acid (the balance being essentially ethylene).

Other copolymers usable in the compositions of the invention can be readily prepared by the above general procedure by replacing vinyl acetate by one of the other group (b) monomers named above and/or by replacing methacrylic acid by one of the other group (c) monomers named above. The copolymers employed in the subsequent examples were made in essentially this way, although initiators other than azobisisobutyronitrile may have been used in their preparation.

The melt index (M.I.) of a polymer or copolymer is well recognized as being related to its molecular weight, the lower the melt index the higher being the molecular weight. The melt index values of the copolymers which are usable in the compositions of the invention range from about 0.5 to 200 and preferably will be within the range of about 5 to about 25.

The term "petroleum wax" as used herein embraces both paraffin and microcrystalline waxes. Paraffin waxes are mixtures of solid hydrocarbons derived through the fractional distillation of petroleum. After purification, they contain hydrocarbons that fall within the formula range of $C_{23}H_{48}$–$C_{29}H_{60}$. They are colorless, hard, translucent materials having melting points of about 130–165° F. Microcrystalline waxes are also obtained through petroleum distillation. They differ from paraffin waxes in being more branched and of higher molecular weight. They are more plastic than paraffin waxes and have melting points of about 165–200° F. Paraffin waxes are generally preferred over microcrystalline waxes for the present purpose because they provide better moistureproofing and are generally of better color. Highly refined microcrystalline waxes with good color are available but are more costly than paraffin waxes with equal color properties. Synthetic hydrocarbon waxes such as the polyethylene and Fischer-Tropsch waxes and mixtures thereof with petroleum waxes may also be used, particularly when high gloss properties are desired.

The petroleum wax-copolymer compositions of the invention are conveniently prepared by dissolving the copolymer in the molten wax. In some instances, it may be desirable to hasten solution by having present a mutual solvent for the wax and the copolymer such as benzene, toluene, xylene, trichlorethylene or perchlorethylene. For those wax-copolymer blends which are relatively viscous, the presence of such a solvent may also be desirable to facilitate application of the blend to surfaces which are to be coated therewith.

The compositions of this invention are useful in coating various substrates and can be applied thereto by one or more conventional coating methods such as dipping, brushing, spraying, roll coating or extrusion coating. For certain coating operations, such as dip coating, ease of removal of excess material is desirable, and unless addition of a solvent to lower the viscosity of the wax blend can be tolerated, the concentration of the copolymer in the coating composition should be kept relatively low. For such applications, it is preferred that the copolymer content of the wax-copolymer blend be about 1–20% by weight, and most preferably, 2–12% by weight. Extrusion coating, on the other hand, requires a stronger, more viscous wax-copolymer blend in order to avoid web failure between the die and the substrate. Compositions containing about 35–75% by weight of copolymer, most preferably about 40–55%, have been found useful for extrusion coating. A wide variety of roll coaters exists in the paper products and film coating industries. Some of these are capable of handling blends which are only slightly more viscous than wax alone, while others are adaptable to blends containing up to about 40% by weight of copolymer. These considerations generally apply to copolymers having melt index values in the range of 10–25. Lower molecular weight copolymers permit somewhat higher concentrations to be employed. Wax-copolymer blends can also be diluted with solvents such as benzene, toluene, xylene, naphtha, trichloroethylene or the like in order to reduce viscosities to levels which can be more easily tolerated by a particular coating operation.

Useful applications of the present compositions are in the preparation of laminated products wherein coatings of the compositions serve to bond foils, films, paper and the like to similar or other surfaces. In such applications, the present compositions are outstanding because of their generally superior adhesive properties and good flexibilities. In other applications involving their use in preparing coated articles such as milk cartons, the waterproofing of fabrics and the moistureproofing of cardboard boxes, the present compositions are especially useful because of their excellent adhesive properties and good properties respecting heat-seal strength, flexibility, toughness, scuff resistance, gloss and low water vapor transmission.

The melt index (M.I.) values reported herein were determined by the tentative ASTM test method D1238–52T (ASTM Standards, 1955, Part 6, pp. 292–295). Each value is the weight in grams of a specific copolymer that is extruded through an orifice 0.0825 inch in diameter and 0.315 inch long over a period of 10 minutes at 190° C. under a pressure of 2160 grams.

As reported herein, the "haze point" of a copolymer-wax blend is the temperature (° C.) at which a melt of the blend shows the first sign of phase separation, as indicated by the development of a distinct haze, upon being cooled at a rate of 1° C. per minute.

All "blocking temperature" reported were determined by TAPPI Suggested Method T652SM–57.

The "heat-seal strengths" reported were determined by TAPPI Suggested Method T642SM–54. They represent the force in grams required to separate sealed strips of paper one inch wide (g./in.) from a substrate. The "paper to paper" values are those for seals between the coated sides of two strips of paper. Other values reported, unless indicated otherwise, are for seals between the coated side of a strip of paper and the uncoated side of a substrate such as glassine or an aluminum foil. The seals tested were made on a Palo Myers sealer and the seal strengths reported were measured on an Instron Tensile Tester.

The "water vapor transmission" (WVT) rates represent the weight in grams of water vapor permeating 100 in.$^2$ of sample in 24 hours at 100° F. and 98% relative humidity. The test method used was essentially that of TAPPI Method T464M–45. Flat and crease values are reported. In determining the crease values for paper coated with a wax blend containing 10% copolymer, the TAPPI method was modified by employing a ratio of linear crease (in.) to area (in.$^2$) of 1.63 with no crossover of creases.

In the coatings indicated in the following examples, the two-sided coatings were applied by a Mayer Machine Company laboratory waxing machine in which the coating composition is applied by rollers and is metered by metal scraping blades. Some of the single-sided coatings were applied by the above machine using a solution of the coating composition in toluene, while others were applied by a doctor blade on paper heated over a hot plate. All coatings were air cooled.

The invention is illustrated by the following examples in which all proportions expressed as percentages are by weight.

*Example 1*

An ethylene/methyl methacrylate copolymer containing 80.9% ethylene and 19.1% methyl methacrylate and having a melt index of 5 was dissolved in a refined paraffin wax having a melting point of 62° C. The resulting blend contained 10% of the copolymer and had a haze point of 72° C. Paper coated on two sides at a coating weight of 15 lbs./ream had heat-seal strengths of: paper to paper, 52; paper to glassine, 6; and paper to aluminum, 34.

A corresponding wax-copolymer blend was prepared using an ethylene/methyl methacrylate/methacrylic acid copolymer containing 79.3% ethylene, 19.3% methyl methacrylate and 1.4% methacrylic acid and having a melt index of 5. The blend had a haze point of 74° C. The vapor transmission rate for paper coated with the blend on two sides at a coating rate of 15 lbs./ream was 0.7 for the flat value and 3.6 for the crease value. The heat-seal strengths were: paper to paper, 54; paper to glassine, 20; and paper to aluminum, 55. The last two heat-seal values are markedly superior to those for the above wax blend with the copolymer devoid of methacrylic acid.

*Example 2*

A flexible coated paper was prepared by coating a titanium dioxide coated sulfite paper on one side using the Mayer Coating Machine with a paraffin wax-copolymer blend at a coating weight of 14 lbs./ream. The blend contained 70% wax and 30% of an ethylene/vinyl acetate/methacrylic acid copolymer containing 30% vinyl acetate and 0.6% methacrylic acid. The melt index of the copolymer was 22. The coated paper had a blocking temperature of 141° F. and a WVT rate of 1.1 for the flat value and 1.1 for the crease value. Its heat-seal strengths (at 225° F., 30 lbs. pressure, 2 sec.) were: paper to paper, 450; paper to aluminum, 240; paper to cellophane, 410; and paper to a polyester film, 120.

For a partial comparison, a similarly coated paper made with a coating (10 lbs./ream) of a wax-copolymer blend containing 30% of an ethylene/vinyl acetate copolymer containing 30% vinyl acetate (no acid component) had a WVT rate of 2.3 for the flat value and 5.0 for the crease value and a paper to paper heat-seal strength of 350.

*Example 3*

An ethylene/diethyl maleate/ethyl hydrogen maleate copolymer containing 14% diethyl maleate and about 1% ethyl hydrogen maleate and having a melt index of 8 was dissolved in a paraffin wax having a melting point of 62° C. The resulting blend contained 10% of the copolymer and had a haze point of about 84° C. Paper coated on one side with that blend at a coating weight of 10 lbs./ream was heat-sealed to uncoated surfaces of paper, glassine, aluminum and cellophane whereby strong adherence of the paper to such surfaces resulted.

Wax-copolymer blends similar to those of the above examples can be prepared employing similar copolymers except that the acid component thereof is an acid such as itaconic acid, fumaric acid, maleic acid or methyl hydrogen fumarate.

*Example 4*

A flexible coated paper was prepared as generally indicated in Example 2 using a petroleum wax-copolymer blend containing 30% of an ethylene/ethyl acrylate/acrylic acid copolymer containing 14% ethyl acrylate and 1% acrylic acid. The coating weight was 10.2 lbs./ream. The coated paper had a WVT rate of 1.8 for the flat value and 2.5 for the crease value. Its heat-seal strengths were: paper to paper, 265; paper to aluminum, 240.

*Example 5*

A flexible coated paper was prepared as indicated in Example 2 using a petroleum wax-copolymer blend containing 40% of an ethylene/vinyl acetate/methacrylic acid copolymer containing 29.7% vinyl acetate and 0.6% methacrylic acid (M.I., 22). The coating weight was 17 lbs./ream. The blocking temperature was 123° F. and the heat-seal strengths were: paper to paper, 207; paper to aluminum, 213; and paper to cellophane, 212.

A similarly coated paper was made with a coating (16 lbs./ream) of a wax-copolymer blend containing 40% of an ethylene/vinyl acetate copolymer containing 29% vinyl acetate (no acid component) and having a melt index of about 15. Its blocking temperature was 116° F. and its heat-seal strengths were: paper to paper, 200; paper to aluminum, 90; and paper to cellophane, 180.

*Example 6*

A coated paper was prepared as indicated in Example 2 using a petroleum wax-copolymer blend containing 30% of an ethylene/methyl methacrylate/methacrylic acid copolymer containing 23.6% methyl methacrylate and 1.5% methacrylic acid (M.I., 9.2). The coating weight was 13.2 lbs./ream. The coated paper had a blocking temperature of 111° F. and a WVT rate of 1.4 for the flat value and 2.5 for the crease value. Its heat-seal strengths were: paper to paper, 310; paper to aluminum, 170; paper to cellophane, 240; and paper to a polyester film, 186.

*Example 7*

Example 6 was repeated using in the wax blend an ethylene/ethyl acrylate/methacrylic acid copolymer containing 21.3% ethyl acrylate and 1% methacrylic acid (M.I., 1.1). The coated paper gave heat-seal strengths of: paper to paper, 316; paper to aluminum, 140; paper to cellophane, 26; and paper to polyester film, 40.

*Example 8*

An ethylene/ethyl acrylate/methyl methacrylate copolymer having a melt index of 3.1 and containing about 14% ethyl acrylate and 1% methacrylic acid was blended with a paraffin wax melting at 62° C. to give a blend containing 10% of the copolymer. The blend had a haze point of 69.5° C.

*Example 9*

An ethylene/methyl methacrylate/methacrylic acid copolymer having a melt index of 9.2 and containing 23.6% methyl methacrylate and 1.5% methacrylic acid was blended with a paraffin wax melting at 62° C. to give a wax blend containing 10% of the copolymer. The blend had a haze point of 68° C. Paper coated with the blend at a coating weight of 14.8 lbs./ream had a blocking temperature of 118° F. Its WVT rate was 0.6 for the flat value and 3.5 for the crease value. Its heat-seal strengths (after sealing at 225° F./30 pounds/2 sec.) were: paper to paper, 67; paper to glassine, 26; paper to aluminum, 70. A similarly coated paper was prepared using a similar wax-copolymer blend except that the copolymer was an ethylene/methyl methacrylate copolymer having a melt index of 4.2 and containing 21.1% methyl methacrylate. This wax blend had a haze point of 71° C. The WVT rate for the coated paper was 1.2 for the flat value and 4.0 for the crease value. Its heat-seal strengths were: paper to paper, 29; paper to glassine, 10; and paper to aluminum, 36.

*Example 10*

An ethylene/n-butyl methacrylate/methacrylic acid copolymer having a melt index of 8.0 and containing about 14% n-butyl methacrylate and 1.5% methacrylic acid was blended with a paraffin wax melting at 62° C. to give a wax blend containing 10% of the copolymer. The blend had a haze point of 67° C.

*Example 11*

An ethylene/ethyl acrylate/maleic anhydride copolymer having a melt index of 3.0 and containing 16% ethyl acrylate and 0.6% maleic anhydride was blended with a paraffin wax melting at 62° C. to give a wax blend containing 10% of the copolymer. The blend had a haze point of 85° C. A coating of the blend was applied to paper with a doctor blade at a coating weight of about 10 lbs./ream, and this was sealed to other uncoated substrates on a Palo Myers sealer at 210° F. with a 200 g. weight. The following heat-seal strengths were obtained: paper to paper, 21; paper to glassine, 46; paper to aluminum, 41.

*Example 12*

An ethylene/ethyl acrylate/divinyl glycol copolymer having a melt index of 7.3 and containing 15.8% ethyl acrylate and about 1% divinyl glycol was blended with a paraffin wax melting at 62° C. to give a wax blend containing 10% of the copolymer. The haze point of the blend was 65.5° C. A 9% blend of this copolymer in the wax was applied with a doctor blade at a coating weight of about 10 lbs./ream to both paper and the second substrate under examination, and the halves were then sealed on a Palo Myers sealer at 210° F. with a 200 g. weight and tested. The heat-seal strengths obtained were: paper to paper, 127; paper to glassine, 81; and paper to aluminum, 63.

*Example 13*

An ethylene/ethyl acrylate/2-hydroxyethyl methacrylate copolymer having a melt index of 7.0 and containing 9.7% ethyl acrylate and about 3% of the hydroxyethyl-methacrylate was blended with a paraffin wax melting at 62° C. to give a wax blend containing 10% of the copolymer. The blend had a haze point of 78.5° C. When the blend was applied to paper as described in Example 11, the following heat-seal strengths were observed: paper to paper, 41; paper to glassine, 76; and paper to aluminum, 63.

*Example 14*

An ethylene/ethyl acrylate/2-dimethylaminoethyl methacrylate copolymer having a melt index of 7.9 and containing 12.1% ethyl acrylate and 0.8% 2-dimethylaminoethyl methacrylate was blended with a paraffin wax melting at 62° C. to give a wax blend containing 9% of the copolymer. The blend had a haze point of 73° C. Paper coated with this blend as described in Example 12 gave the following heat-seal strengths: paper to paper, 140; and paper to glassine, 76.

*Example 15*

An ethylene/ethyl acrylate/2-hydroxy-3-aminopropyl allyl ether copolymer having a melt index of 4.1 and containing 14.2% ethyl acrylate and 0.7% of the ether was blended with a paraffin wax melting at 62° C. to give a wax blend containing 10% of the copolymer. The haze point of the blend was 80° C.

*Example 16*

An ethylene/ethyl acrylate/allyl glycerol ether copolymer having a melt index of 4.1 and containing 13.3% ethyl acrylate and about 3% of the ether was blended with a paraffin wax having a melting point of 62° C. to give a wax blend containing 10% of the copolymer. The blend had a haze point of 74° C. When a 9% blend of the copolymer in the wax was applied to paper described in Example 12, the following heat-seal strengths were observed: paper to paper, 138; paper to glassine, 88; and paper to aluminum, 70.

*Example 17*

An ethylene/ethyl acrylate/N-vinyl pyrrolidone copolymer having a melt index of 3.1 and containing 13% ethyl acrylate and about 1% N-vinyl pyrrolidone was blended with a paraffin wax melting at 62° C. to give a wax blend containing 5% of the copolymer. The blend had a haze point of 7.5° C.

*Example 18*

A flexible paper was prepared by coating a titanium dioxide coated sulfite paper on one side with a paraffin wax-copolymer blend at a coating weight of 13.7 lbs./ream using a Talboys Lab Coater #1500 C. The blend contained 70% wax (M.P., 62° C.) and 30% of an ethylene/vinyl acetate/methacrylic acid copolymer (M.I., 13) containing 27.5% vinyl acetate and 0.7% methacrylic acid. The coated paper had a blocking temperature of 135° F. and its heat-seal strengths were: paper to paper, 434; paper to aluminum, 388; paper to a polyester substrate, 298; paper to cellophane, 374; and paper to polyethylene, 386.

A similar coated paper was prepared under similar conditions except that the copolymer component of the blend was an ethylene/vinyl acetate/methacrylic acid copolymer (M.I., 11) containing 28.8% vinyl acetate and 0.7% methacrylic acid and the coating weight was 15 lbs./ream. The coated paper had a blocking temperature of 137° F. and its heat-seal strengths were: paper to paper, 536; paper to aluminum, 356; paper to polyester substrate, 276; paper to cellophane, 360; and paper to polyethylene, 386.

For comparison, a similar coated paper was prepared under similar conditions except that the copolymer component of the blend was an ethylene/vinyl acetate copolymer (M.I., 15.7) containing 29.4% vinyl acetate (no methacrylic acid). The coated paper had a blocking temperature of 114° F. and its heat-seal strengths were: paper to paper, 302; paper to aluminum, 218; paper to polyester substrate, 234; paper to cellophane, 196; and paper to polyethylene, 282.

*Example 19*

Portions of an ethylene/ethyl acrylate/methacrylic acid copolymer containing 1.2% methacrylic acid, about 14% ethyl acrylate (the balance, ethylene) were diluted by blending with various amounts of an ethylene/ethyl acrylate copolymer containing 85% ethylene and 15% ethyl acrylate to give a ladder of overall methacrylic acid levels. Each copolymer blend was then blended with a paraffin wax (M.P., 62° C.) to give wax-copolymer blends containing 90% wax which were coated on paper (one side) by the doctor blade method and heat-sealed to uncoated glassine at 250° F., 300 grams weight, on a Palo Myers sealer. The heat-seal strengths found were:

| Methacrylic acid in copolymer blend (percent): | Heat-seal Strength (g./in.) of wax-copolymer blend |
|---|---|
| 1.2 | 124 |
| 0.012 | 120 |
| 0.0012 | 41 |
| 0.00012 | 5 |
| 0.000012 | 5 |

These results show that an over-all methacrylic acid content of 0.01% in the copolymer blend is essentially as effective as a content 100 times greater in wax blends containing 10% copolymer.

In addition to having good properties respecting haze point, resistance to water vapor transmission, gloss and blocking temperatures and heat-seal strengths, as shown by the above examples, the compositions of the invention also have good grease resistance and thermal stability. The compositions exhibit in general and to a high degree all of those properties known to be desirable for wax-blend compositions.

We claim as our invention:

1. A composition consisting essentially of (a) 25 to 99% by weight of a petroleum wax and (b) 75% to 1% by weight of a copolymer, said wax and copolymer together constituting at least 80% of the total weight of said composition, said copolymer having a melt index of 0.5 to 200 and being a copolymer of: (1) at least 65% by weight of ethylene, (2) at least 5% by weight of an ester of the group consisting of: the vinyl esters of the lower (1–6 carbon) saturated aliphatic carboxylic acids; the alkyl acrylates, the alkyl methacrylates, the dialkyl maleates and the dialkyl fumarates of the lower (1–6 carbon) aliphatic alcohols; and (3) 0.1 to 3.0% by weight of a monomer of the group consisting of: acrylic, methacrylic, itaconic, maleic and fumaric acids; the anhydrides of itaconic, maleic and fumaric acids; the alkyl hydrogen maleates and the alkyl hydrogen fumarates; the monoacrylates and monomethacrylates of glycols; 2-hydroxy-3-aminopropyl allyl ether, allyl glycerol ether, divinyl glycol, 2-dimethylaminoethyl acrylate, 2-dimethylaminoethyl methacrylate and N-vinyl pyrrolidone.

2. A composition according to claim 1 wherein the copolymer contains 20 to 30% by weight of the group (2) component.

3. A composition according to claim 1 wherein the copolymer contains 20 to 30% of the group (2) component and 0.1 to 1% of the group (3) monomer component.

4. A composition consisting essentially of 25 to 99% by weight of a petroleum wax and 75 to 1% by weight of a copolymer, said wax and copolymer together constituting at least 80% of the total weight of said composition, said copolymer having a melt index of 0.5 to 200 and being a copolymer of at least 65% by weight of ethylene, at least 12% by weight of vinyl acetate and 0.1 to 3% by weight of acrylic acid.

5. A composition according to claim 4 wherein the copolymer contains, by weight, 20 to 30% vinyl acetate and 0.1 to 1% acrylic acid.

6. A composition consisting essentially of 25 to 99% by weight of a petroleum wax and 75 to 1% by weight of a copolymer, said wax and copolymer together constituting at least 80% of the total weight of said composition, said copolymer having a melt index of 0.5 to 200 and being a copolymer of at least 65% by weight of ethylene, at least 12% by weight of vinyl acetate and 0.1 to 3% by weight of methacrylic acid.

7. A composition according to claim 6 wherein the copolymer contains, by weight, 20 to 30% vinyl acetate and 0.1 to 1% methacrylic acid.

8. A composition consisting essentially of 25 to 99% by weight of a petroleum wax and 75 to 1% by weight of a copolymer, said wax and copolymer together constituting at least 80% of the total weight of said composition, said copolymer having a melt index of 0.5 to 200 and being a copolymer of at least 65% by weight of ethylene, at least 12% by weight of ethyl acrylate and 0.1 to 3% by weight of acrylic acid.

9. A composition according to claim 8 wherein the copolymer contains, by weight, 20 to 30% ethyl acrylate and 0.1 to 1% acrylic acid.

10. A composition consisting essentially of 25 to 99% by weight of a petroleum wax and 75 to 1% by weight of a copolymer, said wax and copolymer together constituting at least 80% of the total weight of said composition, said copolymer having a melt index of 0.5 to 200 and being a copolymer of at least 65% by weight of ethylene, at least 12% by weight of ethyl acrylate and 0.1 to 3% by weight of methacrylic acid.

11. A composition according to claim 10 wherein the copolymer contains, by weight, 20 to 30% ethyl acrylate and 0.1 to 1% methacrylic acid.

12. A composition consisting essentially of 25 to 99% by weight of a petroleum wax and 75 to 1% by weight of a copolymer, said wax and said copolymer together constituting at least 80% of the total weight of said composition, said copolymer having a melt index of 0.5 to 200 and being a copolymer of at least 65% by weight of ethylene, at least 12% by weight of methyl methacrylate and 0.1 to 3% by weight of acrylic acid.

13. A composition according to claim 12 wherein the copolymer contains, by weight, 20 to 30% methyl methacrylate and 0.1 to 1% acrylic acid.

14. A composition consisting essentially of 25 to 99% by weight of a petroleum wax and 75 to 1% by weight of a copolymer, said wax and said copolymer together constituting at least 80% of the total weight of said composition, said copolymer having a melt index of 0.5 to 200 and being a copolymer of at least 65% by weight of ethylene, at least 12% by weight of methyl methacrylate and 0.1 to 3% by weight of methacrylic acid.

15. A composition according to claim 14 wherein the copolymer contains, by weight, 20 to 30% methyl methacrylate and 0.1 to 1% methacrylic acid.

References Cited by the Examiner

UNITED STATES PATENTS

| 2,406,039 | 8/46 | Roedel | 260—28.5 |
| 2,845,398 | 7/58 | Brown et al. | 260—28.5 |
| 2,877,196 | 3/59 | Reding | 260—28.5 |

MORRIS LIEBMAN, *Primary Examiner.*

MILTON STERMAN, LESLIE H. GASTON, *Examiners.*